Aug. 12, 1924.
C. R. MacLEAN
1,504,696
CUTTING DEVICE FOR GLASS AND OTHER ARTICLES
Filed Feb. 20, 1922
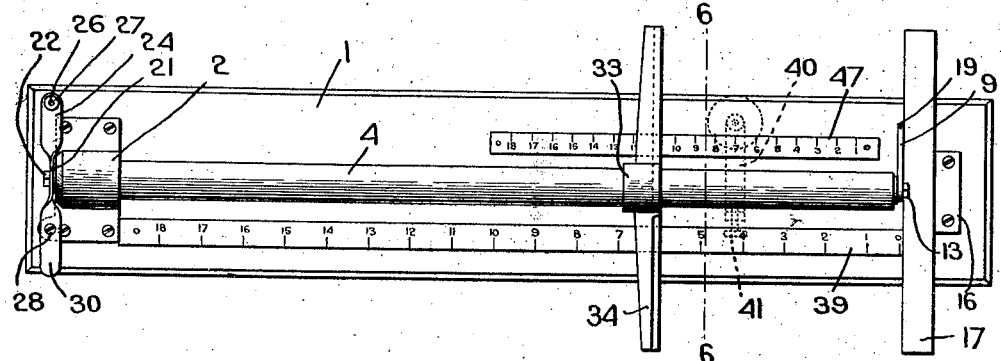
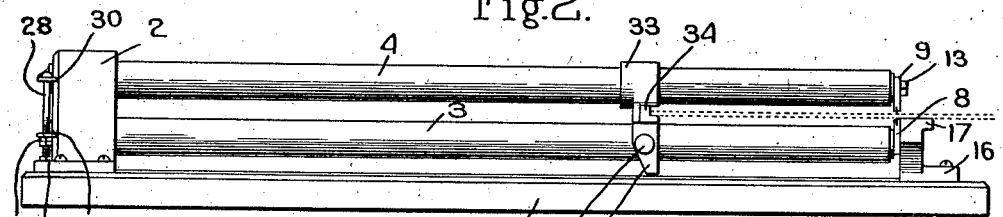
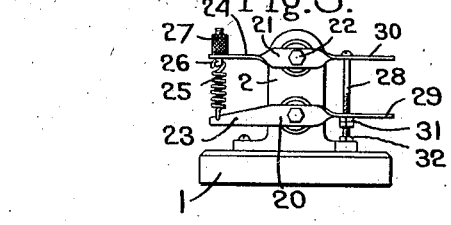
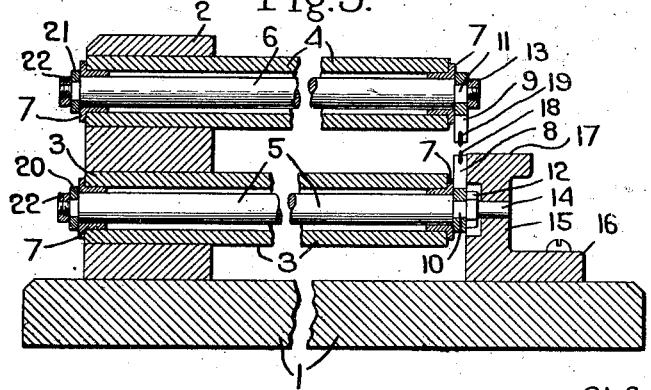
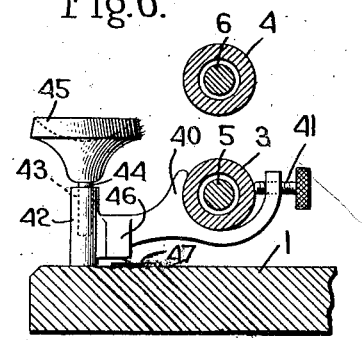
Inventor.
Clifton R. MacLean
by Heard Smith & Tennant
Attys Patented Aug. 12, 1924.

1,504,696

UNITED STATES PATENT OFFICE.

CLIFTON R. MacLEAN, OF STOUGHTON, MASSACHUSETTS.

CUTTING DEVICE FOR GLASS AND OTHER ARTICLES.

Application filed February 20, 1922. Serial No. 537,711.

*To all whom it may concern:*

Be it known that I, CLIFTON R. MACLEAN, a citizen of the United States, and resident of Stoughton, county of Norfolk, State of Massachusetts, have invented an Improvement in Cutting Devices for Glass and Other Articles, of which the following description, in connection with the accompanying drawing, is a specification, like characters on the drawing representing like parts.

This invention relates to improvements in devices for cutting glass and other articles and comprises certain improvements upon the mechanism disclosed in my prior application, Serial Number 474,670, filed June 3, 1921.

One of the principal objects of the present invention is to provide a glass cutting device having means for supporting a plate of glass, or other article, to be cut and comprising a pair of cutting instrumentalities to engage the opposite faces of the plate of glass, or other article, to be cut and provided with means for forcing said cutting instrumentalities against the faces of the glass with equal pressure irrespective of the weight of the article to be cut.

A further object of the invention is to provide a device of the character described with means for simultaneously adjusting the pressure with which the cutting instrumentalities are forced against the glass.

A further object of the invention is to provide means for limiting the approach of the cutting instrumentalities so that they will not engage each other and thereby damage the cutting points or edges of the cutters.

A further object of the invention is to provide novel means for yieldably supporting the cutting instrumentalities. In the preferred embodiment of the invention the cutters are carried at the ends of the arms of rock shafts which are suitably mounted in a supporting frame.

A further object of the invention is to provide a novel form of rigid frame for supporting the rock shafts which carry the cutters, preferably the frame comprising a pair of parallel sleeves having suitable journals in which said rock shafts are mounted.

A further object of the invention is to provide adjustable means for directing the plate of glass relatively to the cutters so that a desired contour may be produced. Desirably the device is provided with a gauge or gauges by means of which the width or diameter, or both, of the article to be cut may be readily determined.

A further object of the invention is to provide a glass cutter of the type specified with means for pivotally supporting the plate of glass in order to enable a circular disk to be cut therefrom.

A further object of the invention is to provide adjustable means for pivotally supporting the plate to enable disks of different diameter to be cut from a plate of glass.

Other objects and features of the invention will more fully appear from the following description and the annexed drawings and will be particularly pointed out in the claims.

A preferred embodiment of the invention is illustrated in the accompanying drawing in which, Fig. 1 is a plan view of a device for cutting glass and other articles;

Fig. 2 is a side elevation of the same;

Fig. 3 is an end elevation of the device shown in Figs. 1 and 2 viewed from the left toward the right;

Fig. 4 shows an end elevation of the device as viewed from the right, the outer support for the article being removed and the bed of the machine shown in vertical section;

Fig. 5 is a vertical longitudinal sectional view through the frame and sleeves which support the rock shafts which carry the cutters, the rock shafts being shown in elevation; and Fig. 6 is a transverse vertical section on line 6—6, Fig. 1, viewed from the left toward the right.

The preferred embodiment of the glass cutting device illustrated in the accompanying drawings comprises a frame having a base 1, preferably of metal, provided adjacent one end with a standard 2 which may be formed integral with the base, but preferably is secured to the same by screws, or other fastening, said standard serving to support the rock shafts which carry the cutting instrumentalities. While any suitable means may be provided for journalling the rock shafts in the standard 2 a pair of parallel sleeves 3 and 4 desirably are securely anchored in suitable apertures in the standard and extend at right angles therefrom, preferably parallel to the base. The rock shafts 5 and 6 are journalled in these standards preferably in bushings 7 suitably located at the ends of the sleeves. Cutter arms 8 and 9 are secured to the respective shafts 5 and 6, preferably said arms having square or rectangular apertures which fit upon squared portions 10 and 11 of the respective rock shafts. Nuts 12 and 13, upon threaded extensions of the rock-shafts, serve to clamp the arms firmly against the shouldered portions thereof. Desirably the lower rock shaft 5 is provided with a longer cylindrical extension 14 which is not threaded, but is journalled in the web 15 of a supporting bracket 16 which is carried by the base plate and is provided with an upper flat article-supporting surface 17 located in a plane intermediate of the normal position of the ends of the cutter arms.

A suitable cuting instrumentality is mounted in the end portion of each of the cutter arms 8 and 9. As illustrated herein the cutting instrumentalities are in the form of hardened steel disks 18 and 19. However, diamonds, or any other usual form of glass cutting instrumentality may be employed.

Suitable means are provided for forcing the glass cutting instrumentalities against the opposite faces of the plate of glass, or other article to be cut, with equal pressure independent of the weight of the glass, or article to be cut, which is carried upon the supporting surface 17 and upon other co-operating supporting means which will hereinafter be more fullly described.

Desirably a convenient means for thus forcing the cutting instrumentalities against the opposite faces of the glass with equal pressure, which is illustrated herein, comprises levers 20 and 21 which are rigidly secured preferably to the opposite ends of the rock shafts 5 and 6 and are actuated by resilient means connecting corresponding arms of said levers. The levers 20 and 21 desirably are provided with rectangular apertures which fit upon corresponding rectangular portions of the ends of the rock shafts 5 and 6 and are secured in place by suitable nuts 22 upon the reduced ends of said rock shafts. The corresponding arms 23 and 24 of said levers, that is to say the arms which extend in the same direction and preferably in the same general direction as the cutter arms 8 and 9, are connected by resilient means such as a helical spring 25 which is secured at one end to one of said arms, preferably the lower and at its other end is adjustably secured to the other arm.

As illustrated in Fig. 3 the upper end of the helical spring 25 is connected to the lower end of a threaded stud 26 which passes through the arm 24 of the lever 21 and is engaged by a preferably knurled nut 27 which rests upon the upper face of the arm 24. By rotating the nut 27 the tension upon the spring 25 may be adjusted. As this spring is connected to both of the lever arms 23 and 24 it will exert equal pressure through the rock shafts upon the arms 8 and 9 which carry the cutting instrumentalities, thus causing them to exert equal pressure upon the opposite faces of the plate of glass, or other article to be cut. Obviously any adjustment which is made of the tension of the spring 25 will correspondingly vary equally the pressure of the cutting instrumentalities upon the opposite faces of the plate of glass or other article to be cut.

It is desirable that means shall be provided for limiting the approaching movement of the cutters so that they will not impinge against each other and thereby dull the cutting instrumentalities. Any suitable stop mechanism may be provided. A preferred means which is illustrated herein comprises a bolt 28 which passes through the arms 29 and 30 of the levers 20 and 21 respectively, said bolt being provided with a stop nut 31 which limits the separation of the arms 29 and 30 and consequently limits the approach of the oppositely extending lever arms 23 and 24 and also the cutter arms 8 and 9. The bolt 28 preferably is mounted in the lower portion of the standard 2 and is secured therein by a set nut 32. Obviously the position of the stop nut 31 also serves to determine the position of the lower cutter relatively to the plane 17 upon which the plate of glass, or other article, is supported.

In addition to the support 17, desirably an adjustable support and gauge is provided which may be adjustably mounted upon the sleeves 3 and 4. As illustrated herein the adjustable guide and support comprises a hub 33 which is slidably mounted upon the upper sleeve 4 which serves to support a flanged or channeled guide 34 which preferably extends a considerable distance in each direction from the hub, the guide being in parallelism with and in the same plane as the supporting surface 17 of the bracket 15.

The guide desirably is provided with downward extensions or lugs 35 and 36 which embrace the lower sleeve 3. A set screw 37, mounted in the extension 36, may be provided to clamp against the lower sleeve 3 and firmly clamp the guide in adjusted position. The extension 36 may be of sufficient length to present an index 38 in co-operative relation to a suitable scale 39 mounted upon the base 1 so that the guide may be set at any desirable distance from the vertical plane of the cutting instrumentalities as illustrated in Fig. 1.

By reason of this construction the desired width of a strip to be cut from a sheet of glass can be readily and quickly determined and if a number of pieces are to be cut the adjustment of the guide will enable the same to be accomplished with accuracy.

A further feature of the invention consists in providing means for cutting circular disks from a plate of glass. This is accomplished by providing an adjustable pivotal supporting member which is adapted to co-operate with the supporting surface 17 above described. In the preferred construction illustrated herein a hook-shaped bracket 40 is provided which is adapted to embrace the lower sleeve 3 and is adapted to be secured in any adjusted position along said sleeve by means of a clamping screw 41 mounted in the hook-shaped bracket in such a manner as to engage the sleeve. The bracket 40 is provided with a standard or post 42 which rests upon the base 1 of the device. The standard or post has a socket 43 to provide a journal for the stem 44 of a pivotal member 45 which preferably comprises a suction device, such as, a rubber suction cup which when pressed against the surface of the glass will adhere firmly to it.

The bracket 40 may be provided with a downwardly extending index 46 adapted to co-operate with a suitable scale 47 which preferably is graduated in such a manner as to indicate the diameter of the disk to be cut. As illustrated herein the graduations of the scale 47 are intervals half the width of the scale 39. Thus by positioning the index 46 of the pivotal stand opposite a selected graduation on the scale 47 a disk, equal in diameter to the numeral upon which the index 46 is set, will be cut.

In the use of the pivotal supporting device for cutting circles the pivotal support serves to sustain the center of the plate while the edge of the plate which projects beyond the plane of the cutting instrumentalities 18 and 19 will rest upon the face 17 on the supporting bracket 15.

It will be understood that the embodiment of the invention disclosed herein is illustrative and not restrictive and that various changes in construction, form and arrangement of parts may be made within the spirit and scope of the following claims.

Having thus described my invention, what I claim as new, and desire to secure by Letters Patent, is:

1. A glass cutting device comprising a frame having a support for the article to be cut, co-operating cutting instrumentalities mounted upon said frame and positioned to engage opposite faces of the article and a single resilient pressure-applying means acting simultaneously upon said cutting instrumentalities to force said cutting instrumentalities against opposite faces of the article with equal pressure.

2. A glass cutting device comprising a frame having a support for the article to be cut, co-operating cutting instrumentalties mounted upon said frame and positioned to engage opposite faces of the article, a single resilient pressure-applying means acting simultaneously upon said cutting instrumentalities to force said cutting instrumentalities against opposite faces of the article with equal pressure and adjusting means operable to vary the force of said pressure-applying means.

3. A glass cutting device comprising a frame having a support for the article to be cut, co-operating cutting instrumentalities mounted upon said frame and positioned to engage opposite faces of the article, a single resilient pressure-applying means acting simultaneously upon said cutting instrumentalities to force said cutting instrumentalities against opposite faces of the article with equal pressure, adjusting means operable to vary the force of said pressure-applying means and means for limiting the approaching movement of said cutting instrumentalities to prevent them from engaging each other.

4. A glass cutting device comprising a pair of rock shafts having arms provided with cutting instrumentalities positioned to engage opposite faces of the article to be cut and a single resilient pressure-applying means acting upon both of said rock shafts to force the cutting instrumentalities against the opposite faces of the article with equal pressure.

5. A glass cutting device comprising a pair of rock shafts having arms provided with co-operating cutting instrumentalities positioned to engage opposite faces of the article to be cut, a single resilient means connected to both of said rock shafts and operable to force said cutting instrumentalities against the opposite faces of said article and means for adjusting said resilient means whereby the pressure applied to said cutting instrumentalities may be varied.

6. A glass cutting device comprising a pair of rock shafts having arms provided with co-operating cutting instrumentalities positioned to engage opposite faces of the article to be cut, levers rigidly connected to said rock shafts and adjustable means, resiliently connecting said levers, acting to force said cutting instrumentalities toward each other with equal pressure.

7. A glass cutting device comprising a pair of rock shafts having arms provided with co-operating cutting instrumentalities positioned to engage opposite faces of the article to be cut, levers rigidly connected to said rock shafts, adjustable means, resiliently connecting said levers, and acting to force said cutting instrumentalities toward each other with equal pressure and means for limiting the approaching movement of said cutting instrumentalities.

8. A glass cutting device comprising a pair of rock shafts having arms provided with co-operating cutting instrumentalities positioned to engage opposite faces of the article to be cut, levers rigidly connected to said rock shafts, adjustable means, resiliently connecting corresponding arms of said levers, and acting to force said cutting instrumentalities toward each other and means engaging the other corresponding arms of said levers for adjustably limiting the approaching movement of said cutting instrumentalities.

9. A glass cutting device having a frame comprising a pair of parallel sleeves rigidly connected together at one end and separated at the other end, rock shafts mounted within said sleeves, arms on said rock shafts having co-operating cutting instrumentalities adapted to engage opposite faces of the article to be cut and a resilient means acting through said rock shafts to force said cutting instrumentalities against the faces of the article with equal pressure.

10. A glass cutting device having a frame comprising a pair of parallel sleeves rigidly connected together at one end and separated at the other, journals in said sleeves, rock shafts mounted in said journals, arms on said rock shafts having co-operating cutting instrumentalities adapted to engage opposite faces of the article, levers rigidly connected to said rock shafts and means, connecting said levers, and acting to force said cutting instrumentalities against the faces of the article with equal pressure.

11. A glass cutting device comprising a base having a standard, parallel rock shafts mounted in said standard having arms provided with co-operating cutting instrumentalities positioned to engage opposite faces of the article to be cut, resilient means acting to force said cutting instrumentalities toward each other with equal pressure, means for supporting the article to be cut located in proximity to said cutting instrumentalities and means for guiding the article to be cut in a predetermined path relative to said cutting instrumentalities.

12. A glass cutting device having a frame comprising a standard, a pair of parallel sleeves mounted in said standard, rock shafts journalled in said sleeves and having arms provided with co-operating cutting instrumentalities positioned to engage opposite faces of the article to be cut, resilient means for forcing said cutting instrumentalities toward each other with equal pressure, means for supporting the article to be cut located adjacent to said cutting instrumentalities and a gauge adjustably mounted on one of said sleeves for positioning the article to be cut.

13. A glass cutting device having a frame comprising a standard, a pair of parallel sleeves mounted in said standard, rock shafts journalled in said sleeves and having arms provided with co-operating cutting instrumentalities positioned to engage opposite faces of the article to be cut, resilient means for forcing said cutting instrumentalities toward each other with equal pressure, means for supporting the article to be cut, located adjacent to said cutting instrumentalities, a gauge adjustably mounted on one of said sleeves for positioning the article to be cut and a scale mounted on said base, graduated to indicate the distance of said gauge from said cutting instrumentalities.

14. A glass cutting device having a frame, comprising a standard, a pair of parallel sleeves mounted in said standard, rock shafts journalled in said sleeves and having arms provided with co-operating cutting instrumentalities positioned to engage opposite faces of the article to be cut, resilient means for forcing said cutting instrumentalities toward each other with equal pressure, stationary means for supporting the article to be cut, located adjacent to said cutting instrumentalities, and pivotal supporting means adapted to co-operate with the stationary article-supporting means whereby the article may be rotated and a circular section cut therefrom.

15. A glass cutting device having a frame comprising a standard, a pair of parallel sleeves mounted in said standard, rock shafts journalled in said sleeves and having arms provided with co-operating cutting instrumentalities positioned to engage opposite faces of the article to be cut, resilient means for forcing said cutting instrumentalities toward each other with equal pressure, means for supporting the article to be cut, located adjacent to said cutting instrumentalities, and a pivotal instrumentality comprising a suction member adapted to be secured to said article and co-operating with said supporting means to enable a circular disk to be cut from said article by rotation of the article about the axis of said pivotal instrumentality.

16. A glass cutting device having a frame comprising a base and a standard, a pair of parallel sleeves mounted in said standard, rock shafts journalled in said sleeves and having arms provided with co-operating cutting instrumentalities positioned to engage opposite faces of the article to be cut, resilient means for forcing said cutting instrumentalities toward each other with equal pressure, means for supporting the article to be cut located adjacent to said cutting instrumentalities, a bracket adjustably mounted upon the lowermost of said sleeves having a post resting upon said base, means for securing the bracket to said sleeve and a pivotal instrumentality mounted in said post comprising a suction member adapted to be secured to said article and co-operating with said supporting means to enable a circular disk to be cut from said article by rotation of the article about the axis of said pivotal instrumentality.

17. A glass cutting device having a frame comprising a base and a standard extending upwardly therefrom, a pair of parallel sleeves mounted in said standard, rock shafts journalled in said sleeves and having arms provided with co-operating cutting instrumentalities positioned to engage opposite faces of the article to be cut, resilient means for forcing said cutting instrumentalities toward each other with equal pressure, means for supporting the article to be cut, located adjacent to said cutting instrumentalities, a bracket adjustably secured to the lowermost of said sleeves and having a post resting on said base, a pivotal instrumentality rotatably mounted in said post comprising a suction member adapted to be secured to said article and co-operating with said supporting means to enable a circular disk to be cut from said article and a scale on said base located in co-operative relation to said cutting instrumentalities having graduations corresponding to the radius of the disk to be cut.

In testimony whereof, I have signed my name to this specification.

CLIFTON R. MacLEAN.